US006468327B1

(12) United States Patent
Siebenhofer et al.

(10) Patent No.: US 6,468,327 B1
(45) Date of Patent: Oct. 22, 2002

(54) PROCESS FOR PROCESSING RESIDUAL SUBSTANCES CONTAINING AT LEAST ONE NONFERROUS METAL AND/OR COMPOUNDS THEREOF

(75) Inventors: Matthaeus Siebenhofer, Graz; Wilhelm Hans Zapfel, Riedlingsdorf; Hertha Luttenberger, St. Stefan i. Rosental, all of (AT)

(73) Assignee: VTU - Engineering GmbH, Grambach (AT)

( * ) Notice: Subject to any disclaimer, the term of this patent is extended or adjusted under 35 U.S.C. 154(b) by 0 days.

(21) Appl. No.: 09/717,697

(22) Filed: Nov. 20, 2000

Related U.S. Application Data

(63) Continuation of application No. PCT/AT99/00127, filed on May 20, 1999.

(30) Foreign Application Priority Data

May 20, 1998 (AT) ................................................. 874/98

(51) Int. Cl.$^7$ ................................................. C22B 3/32
(52) U.S. Cl. .............................. 75/721; 75/739; 75/740
(58) Field of Search ........................... 75/721, 740, 739

(56) References Cited

U.S. PATENT DOCUMENTS

| 4,352,786 A | 10/1982 | Hoh et al. | |
|---|---|---|---|
| 4,400,247 A | * 8/1983 | Ginatta | 204/59 |
| 5,082,493 A | 1/1992 | Barrett et al. | |
| 5,431,713 A | * 7/1995 | Myerson et al. | 75/743 |
| 5,912,402 A | * 6/1999 | Drinkard, Jr. et al. | 75/743 |

FOREIGN PATENT DOCUMENTS

| DE | 2242351 | | 8/1972 | |
|---|---|---|---|---|
| EP | 0581995 | | 8/1992 | |
| JP | 359056534 A | * | 4/1984 | 75/743 |
| JP | 360092431 A | * | 5/1985 | 75/743 |
| WO | 9214850 | | 9/1992 | |

OTHER PUBLICATIONS

Abstract for DE 2242351, Aug. 29, 1972.
Abstract for DE 581995, Aug. 7, 1992.

* cited by examiner

*Primary Examiner*—Roy King
*Assistant Examiner*—Tima McGuthry-Banks
(74) *Attorney, Agent, or Firm*—Lisa B. Kole, Esq.; Baker Botts L.L.P.

(57) ABSTRACT

The invention relates to a method for processing residues containing at least one non-ferrous metal, preferably chosen from the group comprising zinc, lead, nickel, copper and cadmium and/or compounds thereof. According to this method, the non-ferrous metal is extracted from the residues by an extracting agent containing a carboxylic acid and/or a substituted carboxylic acid and/or its alkali salts and/or ammonium salts and/or mixtures thereof.

28 Claims, No Drawings

PROCESS FOR PROCESSING RESIDUAL SUBSTANCES CONTAINING AT LEAST ONE NONFERROUS METAL AND/OR COMPOUNDS THEREOF

This is a continuation of copending application Ser. No. PCT/AT99/00127 filed May 20, 1999, which is incorporated by reference herein.

BACKGROUND OF THE INVENTION

The invention relates to a process for processing residual substances containing at least one nonferrous metal, preferably selected from the group comprising zinc, lead, nickel, copper, and cadmium, and/or compounds thereof.

Both the production of nonferrous metals and the recycling of nonferrous-metal-containing secondary raw materials, such as residual substances from steel works, in particular dusts from steel works, involve considerable amounts of nonferrous-metal-containing products and/or residual substances (Ullmann's Encyclopedia of Industrial Chemistry, $5^{th}$ edition, volume A28, page 512).

Particularly important in terms of quantity are the amounts of zinc-containing residual substances resulting from the production of zinc and from the recycling of residual substances from steel works. These residual substances may be subdivided into three groups:

a) sludges resulting from the electrolytic production of zinc b) slags resulting from the pyrometallurgical production of lead and residues resulting from the pyrometallurgical production of zinc c) dusts containing zinc and lead, mainly resulting from the processing of scrap.

The great annual charges of these residual substances-group c) alone makes up about 880,000 t per year in Europe, with the charges as well as the nonferrous-metal content tending to rise (M. Hoffmann: Die Rückgewinnung von Zink und Blei aus Stäuben der Elektrostahlerzeugung, VDI Bildungswerk, BW 43-20-04, Sep. 22 and 23, 1997)—have already at an early stage led to considerations and to the development of processes which aim at a purifying processing of the above-named residual substances.

DE-650 256 for instance describes a process for processing lead sulfate and lead-sulfate-containing material. Later, the process was also further developed with a view to the recovery of zinc from residual substances of the above-mentioned group a), and it has been used over decades (Ullmanns Enzyklopädie der technischen Chemie, $3^{rd}$ edition, volume 19, page 99).

EP-A-0 581 995 describes a process which aims at the processing of all three groups of residual substances, a), b), and c), in particular at the processing of dusts from steel works and so-called consumer batteries. The pyrometallurgical process step of this process is based on the process rule known from DE-650 256.

Since dusts from steel works make up the biggest quantitative share of zinc-containing residual substances of groups a), b), and c), there has been a large number of considerations about subjecting this group of residual substances to far-reaching processing. Among these processes, only the so-called rolling process economically stands its ground up to now, even though also this process is technically difficult to control (Ullmanns Enzyklopädie der technischen Chemie, $4^{th}$ edition, volume 24, page 599).

The problem of the zinc contamination of airborne dust in the off-gases of iron-scrap converters and electric furnaces is described in the metallurgical literature (F. Pawlek, Metallhüttenkunde, deGruyter, 1983, page 688).

Both in the processing according to DE-650 256 and in the rolling process, the iron of the feed material forms into slag, and it thereby completely escapes recirculation to iron processing, despite a quantitative share of up to 30% in the feed material.

There are attempts to work up dusts from steel works in a hydrometallurgical way, the object being the recycling of both the zinc and the iron-containing residue (M. Hoffmann: Die Rückgewinnung von Zink und Blei aus Stauben der Elektrostahlerzeugung, VDI Bildungswerk, BW 43-20-04, Sep. 22 and 23, 1997). Here, a solution containing ammonium chloride is used. Due to the high solubility of iron in the electrolyte and the limited possibility of recirculating the electrolyte, this process involves a considerable amount of resources used and only a limited recycling.

In Europe, all available processing capacities can process only about half of the quantities of residual substances of groups a) to c) produced every year, the processing furthermore being technically difficult to control. Only a partial recirculation of the valuable substances is achieved, so that a considerable portion of the valuable substances has to be dumped. And it simply will be impossible to manage the increases in the above-named residual substances, which are expected in the short run.

SUMMARY OF THE INVENTION

The object of the present invention is to overcome the above-identified disadvantages and difficulties and to provide a simple process for processing residual substances containing at least one nonferrous metal and/or compounds thereof, which allows a selective separation of the feed material into the various substances and fractions of valuable substances while requiring a cery limited use of technology. Moreover, the process is supposed to bear high variations in the composition of the feed materials.

In a process of the initially described kind, this object is achieved in that the nonferrous metal is extracted from the residual substances by means of an extracting agent containing a carboxylic acid and/or a substituted carboxylic acid and/or their alkali and/or ammonium salts and/or mixtures thereof.

In the residual substances the nonferrous metal may be present in metallic or oxidic form or salt-like. For the purpose of the present description, "extraction" means separation of the nonferrous metal from the residual substances, the nonferrous metal after separation from the residual substances being present in ionic form.

A Preferably, a fatty acid having 1 to 18 C atoms in the molecule, in particular acetic acid or propionic acid, is used as a carboxylic acid.

DETAILED DESCRIPTION OF THE PREFERRED EMBODIMENTS

The process according to the invention is very advantageously used for the processing of residual substances containing iron and nonferrous metal, in particular residual substances from steel works, and the processing of residual substances resulting from the thermal untilization of so-called consumer batteries.

The principle of the process according to the invention lies in the physicochemical interaction of nonferrous metals and, optionally, iron with carboxylic acids, substituted carboxylic acids, their alkali and ammonium salts or mixtures thereof, which interaction leads to big differences in the solubility of the various metal species as a salt in the carboxylic acid used.

The following table shows representative solubility data for various metal species in an aqueous solution, related to an extraction with acetic acid.

| Species | Solubility in Water [g/l] at Room Temperature |
|---|---|
| Zinc acetate | 300 |
| Fe-III-acetate | Traces |
| Lead-II-acetate | 443 |
| Nickel acetate | 166 |
| Copper-II-acetate | 72 |

Above all, a big difference in the distribution of iron and nonferrous metals between an extract phase and a solid phase can be deduced from this list. This property corresponds to one of the basic requirements for the recycling of large quantities of feed materials having a heterogeneous composition.

This extraction process meets the demand for a technologically simple procedure in that it may be applied in both a very large range of concentration of the reactive component, i.e., the carboxylic acid, substitued carboxylic acid, their alkali and ammonium salts or mixtures thereof, in an aqueous solution and a very large temperature range up to the boiling point of the extracting agent.

This behaviour is confirmed for instance by the dissoluting behaviour of zinc in acetic acid, which is nearly independent of the concentration (Gmelins Handbuch der anorganischen Chemie, System No. 32, Zinc, Supplement, Verlag Chemie, 1956, page 584).

The concentration and composition of the extracting agent and the operating temperature are optimization parameters, which have an influence on the economic efficiency and the desired result of the separation, but not on the process rule. The composition of the extracting agent and the concentration of the reactive components can be analysed and set according to usual prior art techniques.

In contrast to the processes known from prior art, tramp elements, such as the alkali metal portion in the feed material, do not interfere because the extraction is also possible with the salts of the corresponding carboxylic acids of these elements.

The essential difference to the processes applied according to prior art is, apart from the further direct-for instance metallurgical-usability of all product streams of the extraction process, that the extraction is carried out in the low-temperature range (which for the purpose of the present description means temperature range up to the boiling temperature of the extracting agent used), while metallurgical processes known from prior art have to be carried out at a very high temperature so as to allow the desired splitting of the feed material into a valuable-substance phase and a residue phase which can not be further utilized metallurgically. In metallurgical processes, the necessary operating temperature is often very close to the melting temperature of the feed material, in particular in the case of a relatively high alkali load. However, when a melting phase occurs, the separation to the desired extent is not possible any more, let alone the high material stress.

A preferred embodiment of the process according to the invention is characterized in that an extraction residue remaining in the course of the extraction and possibly containing iron is subjected to further processing. In particular, processing is carried out in an metallurgical (iron) works. Hereby, a significant increase in economic efficiency of the process can advantageously be achieved.

Especially in the extraction of zinc from dusts coming from steel works, the process according to the invention is of advantage, given that the extraction residue is enriched iron oxide, which in the form in which it is present can again be worked by iron metallurgy. For this reason, the residue-free improvement of the residuary product of dust from steel works is possible by obtaining pure zinc and other metals and by recovering iron.

Preferably, the process according to the invention uses the carboxylic acid and/or substituted carboxylic acid and/or their alkali and/or ammonium salts and/or mixtures thereof in a concentration of 5 to 100% by weight.

It is further preferred to use solutions of the carboxylic acid and/or substituted carboxylic acid and/or their alkali and/or ammonium salts and/or mixtures thereof in solvents, such as water, alcohols, aldehydes, ketones, esters, and mixtures thereof, as extracting agents so as to influence (above all suppress or prevent) the co-extraction of undesired matrix elements of the feed material. Here, matrix means portion of the feed material, whose extraction is, according to the inventive process, not desired.

Advantageously, substances such as oxides, halogenides, sulfates, nitrites, nitrates, sulfides, or organosulfides are used together with the extracting agent, again to influence the co-extraction of matrix elements of the feed material.

In the process according to the invention, the extraction is preferably carried out in a temperature range in which the extracting agent is present in liquid form or, under liquefaction in the residual substance to be extracted, is introduced into the same in vapour form.

According to a preferred embodiment, the nonferrous metal by way of solid-liquid-extraction is extracted from residual substances which are present in the form of solids. However, it is also possible to extract the nonferrous metal from residual substances present in the form of suspensions and/or solutions, the suspension or solution having the same extraction behaviour in the above-named extracting agent as with an extraction from solids.

According to another preferred embodiment, the nonferrous metal extracted from the residual substances is separated from the extract formed in the extraction. Preferably, the extracting agent is recirculated after separation of the nonferrous metal. The possibility of working up the extract completely and the possibility of reusing the extracting agent are substantial features of the process according to the invention.

The separation can be carried out according to a large number of techniques. According to one embodiment of the inventive process, the separation of the nonferrous metal from the extract takes place by crystallization, possibly by fractional crystallization, this being the simplest form of further processing the nonferrous-metal compound from the extract. The direct industrial utilization of the crystalline product of the extraction or the various fractionally prepared products is possible. However, the crystalline solid can also be decomposed thermally at a later moment, and the product of this separating operation may be subjected to pyrometallurgical or hydrometallurgical further processing according to prior art (Ullmanns Enzyklopädie der technischen Chemie, $4^{th}$ edition, volume 24, pages 601 to 611).

According to another preferred embodiment of the inventive process, the separation is effected in an electrolytic way.

Here, the charged extracting agent can be regenerated directly in an electrolytic way by non-selective deposition of metals.

From obtaining zinc by hydrometallurgy it is known that a very strong purification effort has to be made for the electrolyte so as to allow an electrolytic separation of the base metal of zinc from aqueous electrolyte solutions to take place at all. Already traces of impurities are enough to lower the hydrogen overvoltage in the electrolysis of zinc to such a level that a redissolution of already deposited zinc from the cathode takes place (Ullmann's Encyclopedia of Industrial Chemistry, $5^{th}$ edition, volume A28, page 524).

However, it has been found that in the process according to the invention the separation of zinc in the non-selective electrolytic deposition of the metals from the extract is possible even at a very high concentration of so-called interfering elements. In the process according to the invention, this property allows the use of various electrolytic separating techniques which on the one hand allow the processing of unrefined and refined extracts and on the other hand allow the direct electrolytic extract regeneration with a metal deposition as well as membrane electrolytic processes or diaphragm electrolytic processes with extract-like or alien anolytes with a chemical oxygen linkage as an oxide or under formation of per-compounds having an oxidizing effect in the extraction or under release of gaseous oxygen.

The electrolytic separation from the extract may be effected completely or partially. Optionally, individual metals, such as zinc, may also be separated in a fractional electrolytic way, for instance after a previous purifying separation of co-extracted other metal species; here, the purification may be effected by precipitation, cementation on zinc dust, or other suitable purifying processes, such as fractional crystallization or liquid-liquid-extraction.

In the process according to the invention, the electrolytic extract regeneration with a metal separation may be influenced by various known additives. By way of example, the influence of methanol (Gmelins Handbuch der anorganischen Chemie, System No. 32, Zinc, Supplement, Verlag Chemie, 1956, page 527) or the influence of ammonia on the electrodeposition behaviour of zinc (Gmelins Handbuch der anorganischen Chemie, System No. 32, Zinc, Supplement, Verlag Chemie, 1956, page 247) are mentioned.

According to another preferred embodiment of the inventive process, the separation is effected chemically, for instance by precipitation. Here, purification of the extract by known techniques is possible. As an example, the zinc/lead separation by precipitation of lead as a sulfate is mentioned (Gmelins Handbuch der anorganischen Chemie, System No. 32, Zinc, Verlag Chemie, 1932, page 93). The separation of zinc and the metals of copper, cadmium, nickel, and cobalt is also documented and has proved its value in practice (Ullmanns Enzyklopädie der technischen Chemie, $4^{th}$ edition, volume 24, page 599; Gmelins Handbuch der anorganischen Chemie, System No. 32, Zinc, Supplement, Verlag Chemie, 1956, pages 222 to 229). These separating processes can also be applied to the process according to the invention.

According to another embodiment of the process, the separation is effected thermally, the indicated possibilities being a thermal separation by cleavage or sublimation, a thermometallurgical or chemical separation of the solvent from the extracted species under conversion of the same into oxides or, by adding additives having a reducing effect, into the metal, and a recirculation of the extracting agent or extracting-agent mixture.

A decisive property of salts of the carboxylic acids used according to the invention is thermal cleavability, a process step in which the extracting agent may be completely recovered from the extract. This demand for the possibility of recirculating the extracting agent is met for instance in the extractive separation of iron and nonferrous metals with acetic acid, because the acetates are cleaved at relatively high temperatures. Thus, zinc acetate is transformed into acetic acid and zinc oxide at temperatures above 200° C. Iron acetate is decomposed into iron oxide and acetic acid as well.

The processing of the metal compounds obtained by one of the above-named techniques and obtained from the extract as a solid can be effected after thermal separation of the extracting agent by a complete or partial dissolution in a true electrolyte, such as sulfuric acid or hydrochloric acid, or electrolyte mixtures, with a subsequent process-specific electrolyte purification by precipitation, cementation, or other suitable separating processes, and an electrolytic deposition of the metal.

According to another preferred embodiment, an acid stronger than the acid contained in the extracting agent is added to the extract, after separation from the extraction residue, and the extracting agent is separated from the thus treated extract by way of distillation.

In the following, preferred embodiments of the invention will be explained in more detail by way of exemplary embodiments.

EXAMPLE 1

Quantities of 10 g of dust from steel works were extracted at room temperature with quantities of 100 ml of acetic acid having different concentrations (25 to 100% by weight), respectively. After an extraction time of one hour, the extract was separated from the solid refined product and/or extraction residue. Both phases were analysed, and the following results were found:

Composition in [g/kg] of the steel-works dust used:

| | |
|---|---|
| Zinc | 273.00 |
| Iron | 179.00 |
| Lead | 31.70 |
| Copper | 4.52 |
| Nickel | 0.61 |
| Cadmium | 0.19 |
| Cobalt | 0.03 |
| Sodium | 8.50 |
| Potassium | 6.30 |

Extraction degree for zinc and iron, related to the quantity used and under variation in the concentration of acetic acid in the extracting agent:

| % by weight of acetic acid | Degree of extraction of zinc (%) | Degree of extraction of iron (%) |
|---|---|---|
| 25 | 92.30 | 6.10 |
| 50 | 93.40 | 6.70 |
| 80 | 90.80 | 5.00 |
| 100 | 35.50 | 0.60 |

The results show that in a large concentration range of the extracting agent of acetic acid the extraction of zinc gives a high yield. At room temperature, the degree of extraction decreases only when the extracting agent is anhydrous. The more the concentration of the extracting agent increases, the more the degree of extraction of Fe-III decreases.

EXAMPLE 2

320 g of the same dust were extracted at room temperature with 800 ml of acetic acid having a content of 20% by weight. The course in time of the concentration of various elements in the extract was examined.

| t [min] | Zn [g/l] | Pb [g/l] | Cd [g/l] | Fe [g/l] | Cu [g/l] | Ni [g/l] | Na [g/l] | K [g/l] |
|---|---|---|---|---|---|---|---|---|
| 30 | 79.00 | 7.20 | 0.13 | 1.55 | 0.53 | 0.16 | 7.00 | 3.60 |
| 60 | 82.00 | 7.20 | 0.12 | 1.15 | 0.54 | 0.17 | 7.00 | 3.60 |
| 75 | 83.00 | 7.60 | 0.13 | 1.10 | 0.54 | 0.20 | 7.00 | 3.60 |
| 90 | 82.00 | 7.40 | 0.13 | 1.01 | 0.56 | 0.22 | 7.00 | 3.70 |
| 105 | 83.00 | 7.40 | 0.13 | 0.90 | 0.56 | 0.24 | 7.00 | 3.60 |
| 120 | 83.00 | 7.60 | 0.13 | 0.78 | 0.57 | 0.25 | 7.00 | 3.60 |

It can be seen in the table that the extraction behaviour of the metals is in accordance with the dissolution behaviour of the corresponding acetates in an aqueous solution. With the exception of Fe-III, metals having a low solubility show a slightly increasing concentration in the extract phase. Metal acetates having a high solubility in an aqueous solution are already extracted within 30 minutes.

EXAMPLE 3

The extracting agent of Experiment 2 was separated from the remaining solid after 120 minutes. After an ageing phase of two hours and the separation of a concentration precipitate by filtration the electrolyte was subjected to a non-selective direct electrolysis in an electrolysis cell. An aluminium tube was used as cathode to achieve constant cathode-current densities. A net-shaped electrode made of platinum was used as anode. Electrolysis was carried out at a constant cathode-current density of 930 A/m$^2$. At the beginning of the electrolysis, the charged extracting agent had a temperature of 22° C. At the end of this examination, a bath temperature of 35° C. was measured.

Electrolysis was carried out over a period of 100 minutes. The current/voltage curve was recorded. Data are compiled in the following table:

| t [min] | U [V] | I [A] |
|---|---|---|
| 00 | 5.8 | 2.20 |
| 10 | 5.0 | 2.20 |
| 25 | 4.7 | 2.20 |
| 50 | 4.4 | 2.20 |
| 75 | 4.3 | 2.20 |
| 100 | 4.1 | 2.20 |

The time change in the bath voltage was caused by the change in the temperature and the change in the distance between the electrodes. During the experiment, samples were taken from the electrolytic bath, and the course in time of the decrease in the individual elements in the electrolytic bath was determined by analysis. The results are compiled in the following table:

| t [min] | Zn [g/l] | Pb [g/l] | Cd [g/l] | Fe [g/l] | Cu [g/l] | Ni [g/l] | Na [g/l] | K [g/l] |
|---|---|---|---|---|---|---|---|---|
| 00 | 89.00 | 7.70 | 0.15 | 0.47 | 0.58 | 0.05 | 6.70 | 3.85 |
| 10 | 82.00 | 5.00 | 0.15 | 0.44 | 0.50 | 0.05 | 6.80 | 3.65 |
| 25 | 74.00 | 2.60 | 0.14 | 0.41 | 0.43 | 0.05 | 6.80 | 3.70 |
| 50 | 59.00 | 0.90 | 0.09 | 0.40 | 0.28 | 0.06 | 6.90 | 3.80 |
| 75 | 48.00 | 0.30 | 0.05 | 0.36 | 0.16 | 0.06 | 6.80 | 3.90 |
| 100 | 35.00 | 0.19 | 0.03 | 0.35 | 0.08 | 0.06 | 6.70 | 3.90 |

As can be seen in the table, a considerable amount of iron and nickel was separated together with the precipitate from the extract by the second filtration.

As refers to the examined bath composition, it has to be said that despite the extremely high nickel content in the extract the hydrogen overvoltage for the deposition of zinc could be kept at such a high level that hardly any formation of hydrogen could be observed at the cathode. Usually, for the separation of zinc, the nickel content has to be below 3 mg/l (Ullmanns Enzyklopädie der technischen Chemie, 4$^{th}$ edition, volume 24, page 606).

The high content of iron did not have any measurable influence on the electrodeposition behaviour, either.

EXAMPLE 4

Concentrated sulfuric acid was pipetted dropwise to 10 ml of a sample of extraction experiment 2, which was double-filtrated and aged over two hours, until a lead sulfate precipitate formed. After separation of the precipitate, a lead content of 6.70 g/l was measured. The experiment shows that the extract can be purified before the electrodeposition of zinc.

EXAMPLE 5

42 ml of a sample of Experiment 1, prepared by way of an extraction with acetic acid having a content of 50% by weight, were subjected to electrolytic metal deposition at room temperature, a current density of 400 A/m$^2$, and a constant current intensity of 0.63 A, the time of electrolysis being 25 minutes. A flat aluminium cathode and a flat net-shaped anode made of platinum were used. In this experiment, the zinc was separated from the extract from an initial zinc concentration of 25 g/l to a residual concentration of 18 g/l. The experiment shows that it is possible to directly separate zinc from a diluted unrefined extract solution by electrolysis.

EXAMPLE 6

7 g of steel-works dust containing 35.8% by weight of Zn, 5.41% by weight of Pb, and 13.35% by weight of Fe were treated in an extractive way with 70 g of an extracting agent consisting of 14 g of acetic acid and 56 g of water at 20° C.

The extract phase obtained contained 82.7% by weight of Zn, 65.9% by weight of Pb, and 8.7% by weight of Fe.

EXAMPLE 7

Example 6 was repeated; however, an extracting agent was used which consisted of 14 g of acetone, 14 g of acetic acid, and 42 g of water.

The extract phase obtained contained 79.2% by weight of Zn, 43.1% by weight of Pb, and 7.5% by weight of Fe.

EXAMPLE 8

Example 6 was repeated; however, an extracting agent was used which consisted of 14 g of isopropanol, 14 g of acetic acid, and 42 g of water.

The extract phase obtained contained 79.1% by weight of Zn, 45.5% by weight of Pb, and 6.5% by weight of Fe.

Examples 6–8 document that the yield of individual extractants may be significantly influenced by a modification of the extracting agent.

What is claimed is:

1. A process for processing residual substances containing at least one nonferrous metal, comprising contacting the residual substances with an extracting agent comprising (i) at least one substance selected from the group consisting of a carboxylic acid, an alkali salt of a carboxylic acid, an ammonium salt of a carboxylic acid, a substituted carboxylic acid, an alkali salt of a substituted carboxylic acid and an ammonium salt of a substituted carboxylic acid; and (ii) at least one substance selected from the group consisting of an alcohol, an aldehyde, a ketone and an ester.

2. A process according to claim 1 wherein the nonferrous metal is at least one selected from the group consisting of zinc, lead, nickel, copper, cadmium and compounds thereof.

3. A process according to claim 1 wherein the carboxylic acid is a $C_1$ to $C_{18}$ fatty acid.

4. A process according to any one of claim 1, claim 2 or claim 3 wherein the residual substances further comprise iron.

5. A process according to claim 3 wherein the carboxylic acid is selected from the group consisting of acetic acid and proprionic acid.

6. A process according to any one of claim 1, claim 2, claim 3 or claim 5 wherein the extracting agent comprises 5 to 100% by weight of the at least one substance.

7. A process according to claim 4 wherein the extracting agent comprises 5 to 100% by weight of the at least one substance.

8. A process according to any one of claim 1, claim 2, claim 3 and claim 5 comprising contacting the residual substances with the extracting agent and at least one selected from the group consisting of oxides, halogenides, sulfates, nitrites, nitrates, sulfides, and organosulfides.

9. A process according to claim 4 comprising contacting the residual substances with the extracting agent and at least one selected from the group consisting of oxides, halogenides, sulfates, nitrites, nitrates, sulfides, and organosulfides.

10. A process according to claim 6 comprising contacting the residual substances with the extracting agent and at least one selected from the group consisting of oxides, halogenides, sulfates, nitrites, nitrates, sulfides, and organosulfides.

11. A process according claim 7 comprising contacting the residual substances with the extracting agent and at least one selected from the group consisting of oxides, halogenides, sulfates, nitrites, nitrates, sulfides, and organosulfides.

12. A process according to any one of claim 1, claim 2, claim 3 or claim 5 comprising contacting the residual substances with the extracting agent at a temperature wherein the extracting agent is in a liquid form.

13. A process for processing residual substances containing at least one nonferrous metal, comprising contacting the residual substances with an extracting agent comprising at least one substance selected from the group consisting of a carboxylic acid, an alkali salt of a carboxylic acid, an ammonium salt of a carboxylic acid, a substituted carboxylic acid, and alkali salt of a substituted carboxylic acid and an ammonium salt of a substituted carboxylic acid, wherein contacting includes introducing the extracting agent into the residual substances in a vapor form and converting the extracting agent is in a liquid form.

14. A process according to claim 12 wherein the residual substances are in solid form.

15. A process according to claim 13 wherein the residual substances are in solid form.

16. A process according to claim 12 wherein the residual substances are present in at least one selected from the group consisting of a solution and a suspension.

17. A process according to claim 13 wherein the residual substances are present in at least one selected from the group consisting of a solution and a suspension.

18. A process according to any one of claim 1, claim 2 or claim 3 further comprising separating the nonferrous metal from the extracting agent.

19. A process according to claim 18 further comprising recovering the extracting agent and using the recovered extracting agent in the process of claim 1.

20. A process according to claim 18 comprising separating the nonferrous metal by crystallization.

21. A process according to claim 18 comprising separating the nonferrous metal by fractional crystallization.

22. A process according to claim 18 comprising separating the nonferrous metal using an electrolytic process.

23. A process according to claim 18 comprising separating the nonferrous metal by contacting the extracting agent with a chemical which precipitates the nonferrous metal.

24. A process according to claim 18 comprising separating the nonferrous metal using a thermal process.

25. A process according to 18 claim further comprising adding an acid stronger than any acid present in the extracting agent to the extracting agent and recovering the extracting agent using a distillation process.

26. The process according to claim 13 wherein the nonferrous metal is at least one selected from the group consisting of zinc, lead, nickel, copper, cadmium and compounds thereof.

27. The process according to claim 13 wherein the carboxylic acid is a $C_1$ to $C_{18}$ fatty acid.

28. The process according to claim 27 the carboxylic acid is selected from the group consisting of acetic acid and proprionic acid.

* * * * *